Patented May 12, 1931

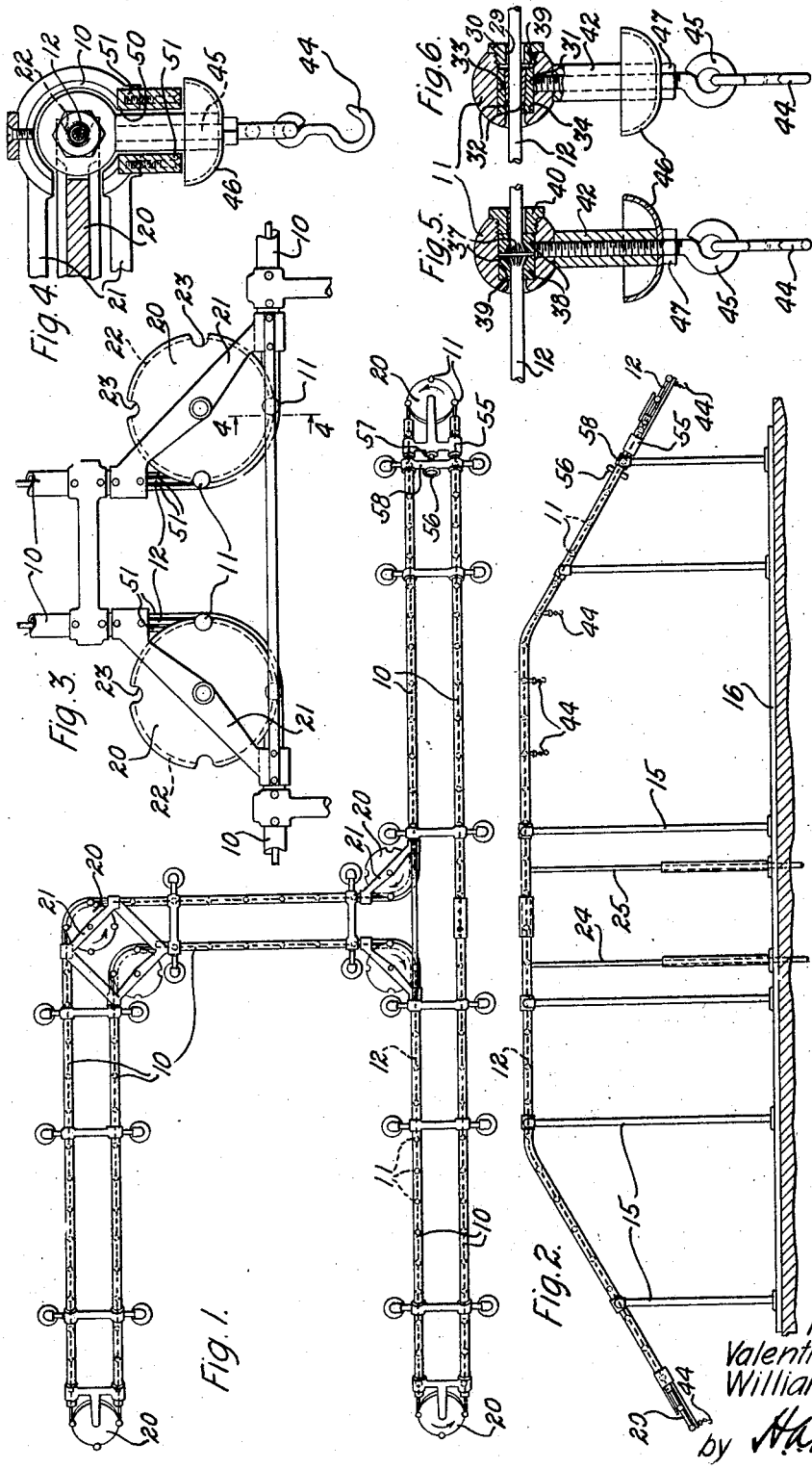

1,804,923

UNITED STATES PATENT OFFICE

VALENTINE WALTER FERNEKES AND WILLIAM HARRY RAY, OF CHICAGO, ILLINOIS, ASSIGNORS TO WESTERN ELECTRIC COMPANY, INCORPORATED, OF NEW YORK, N. Y., A CORPORATION OF NEW YORK

CONVEYING SYSTEM

Application filed June 1, 1928. Serial No. 282,122.

This invention relates to conveying systems, and more especially to a conveying system for transporting articles from various points in a factory.

The primary object of this invention is a conveying system which is simple and flexible and which may be caused to travel in different paths permitting it to be accommodated in a relatively small area.

In accordance with the general features of the invention, one embodiment thereof comprises an endless cable having secured thereto spaced spherical members which support the cable within slotted guide tubes and drive it through various paths by engaging a power driven sprocket wheel, suitable means for carrying articles are secured to selected spherical members and protrude through the slots in the tubes.

Other objects and features of the invention will be readily apparent from the following detailed discription when considered with the accompanying drawings, wherein Fig. 1 is a plan view of an apparatus disclosing one embodiment of the invention;

Fig. 2 is a front elevational view thereof;

Fig. 3 is an enlarged fragmentary plan view of a part of the apparatus showing the spherical members of the cable in engagement with the sprockets;

Fig. 4 is an enlarged fragmentary sectional view taken on lines 4—4 of Fig. 3;

Fig. 5 is an enlarged sectional view of a spherical member by means of which the ends of the cable are connected together, and Fig. 6 is an enlarged view partly in section of a spherical member having a hook for carrying articles suspended therefrom and showing the clamping means whereby the spherical members are fastened in spaced relationship upon the cable.

Referring to the drawings wherein like numerals designate similar parts throughout the several views, the numeral 10 designates a slotted tube for supporting and guiding spherical members 11 which are carried in spaced relation by an endless cable 12. The guide-tubes 10, which may be formed into various shapes, are held in the desired position by means of standards 15, suitably secured to a floor 16 or suspended from a ceiling. Arranged at points where sudden changes in the direction of travel of the cable occur are sprocket wheels 20 supported by brackets 21 secured to the guide tubes 10. The wheels 20 have grooves 22 for receiving the cable 12 and spaced recesses 23 in their peripheries for engaging the balls or spherical members 11.

One or more of these sprocket wheels may be utilized as a driving means for continuously moving the cable, but in order to distribute the stresses over a greater number of the spherical members the cable is shown in Fig. 2 of the drawings as being driven by two of the sprocket wheels connected by shafts 24—25 to any suitable source of power (not shown).

In spacing and securing the spherical members or balls 11 to the cable (Fig. 6), the cable 12 is threaded through central apertures of a plug 30, an internally tapered cylindrical member 31, and the ball 11, respectively; a pair of externally tapered semi-circular sleeves 32—32 substantially surrounding the cable is placed at the desired location thereon and the internally tapered cylindrical member 31 is forced over the gripping sleeves 32—32 thereby effectually clamping them to the cable. This assembly is inserted in a bore 33 having a shoulder 34, of the ball 11 and the plug 30 is threaded therein. A sufficient clearance 29 between the ends of the cylindrical member 30 and its sleeves 32 is provided to permit the ball to freely swivel or "float" around the cable. From the foregoing it will be readily understood that when considerable pressure is exerted on the rear side of the ball 11 with respect to the direction of travel, the clamping action of the gripping sleeves 32—32 will increase due to the cylindrical member 31 abutting the shoulder 34 being forced still further over the semi-circular sleeves.

Since the cable must be in the form of an endless loop, the ends thereof are fastened within one of the spherical members or balls 11 by means illustrated in Fig. 5 of the drawings. The ends of the cable are inserted into countersunk openings 37 of a pair of blocks 38—38 and frayed out into the countersunk portions; a fusible material, such as zinc, is then poured into the countersunk openings to thereby firmly attach the cable ends to the blocks. This particular ball 11 is provided with a recess 39 for receiving the blocks which are retained therein by means of a threaded plug 40.

From selected ones of the spherical members or balls 11 are suspended hooks 44 carried in I-bolts 45 threaded into the underside of the spherical members. The shanks of the bolts 45 are surrounded by bushings 42 which protrude through a slot 50 (Fig. 4) in the underside of the guide-tube 10 and are adapted to prevent swinging of the bolts from a suspended position. Cup-shaped members 46 for catching grease used in lubricating the tubes abut the lower ends of the bushings 42 and are rigidly fastened to the spherical member by a clamping nut 47. The slot 50 serves to keep the I-bolts in a suspended position when the balls are supported within the tubes and as they emerge from the guide-tubes they are properly guided and supported as they pass around the sprocket wheels 20. For this purpose guide bars 51 suitably secured to the brackets 21 are spaced on each side of the suspended bolts 45 whereby the upper surfaces of the guide bars support the balls 11 and the sides thereof contact with the bushings 42 to prevent a lateral movement of the bolts 45.

To maintain the endless cable under proper tension a movable support 55 (Figs. 1 and 2) for one of the sprocket wheels 20 is slidably mounted on two parallel guide tubes 10 and is equipped with a hand wheel 56 having a shaft 57 threaded into a fixed bracket 58. The shaft 57 is rotatably secured in the support 55 and it will be readily seen that by turning the hand wheel 56 the sprocket wheel can be moved inwardly or outwardly to regulate the tension of the cable.

This conveying system, due to its simplicity and flexibility, wherein the spherical members form their bearings directly within the tubular housing, is particularly applicable to the assemblage of small apparatus wherein a plurality of operations are successively performed by operators working in different locations. The part or parts in various stages of assembly can be readily suspended from the hooks or any other suitable means attached to the traveling spherical members and thereby moved overhead to clear trucking aisles, obstacles, etc., or transported around corners or between different floors of buildings to convenient working locations positioned at various levels.

Although the invention has been herein described in connection with the transporting of small light-weight articles, it is to be understood that the invention is capable of many other applications and modifications without departing from the spirit and scope of the invention.

What is claimed is:

1. In a conveying system, an endless cable, a spherical self-tightening member carried thereby for supporting articles, and tubular means forming a direct bearing for the spherical member for guiding it through various angles.

2. In a conveying system, an endless cable, spherical members secured thereto at a predetermined spacing, a slotted tube forming a direct bearing for the spherical members, means attached to the spherical member and protruding through the slot in the tube for supporting articles to be transported, a cup-shaped member secured to said means, and means for driving the cable.

3. In a conveying system, a cable, means carried by the cable for supporting an article, and a self-tightening means for securing the supporting means to the cable in a swivel connection.

4. In a conveying system, a cable, a spherical member for supporting an article, means for attaching the spherical member in a swivel connection to the cable comprising elements substantially surrounding the cable, and a cylindrical member retained within the spherical member and surrounding the elements for transmitting a clamping action thereto.

5. In a conveying system, a cable, a spherical member, means for fastening the ends of the cable therein for forming a loop comprising a pair of members having recesses adapted to receive the frayed ends of the cable, a fusible metal filling the vacant spaces in the recesses, and a plug threaded into an opening in the spherical member for retaining the members therein.

6. In a conveying system, a conveying means, means attached thereto for supporting articles, and means carried by the article supporting means for preventing a lubricant for the conveying means from contacting with the articles being conveyed.

In witness whereof, we hereunto subscribe our names this 16th day of May, A. D. 1928.
VALENTINE WALTER FERNEKES.
WILLIAM HARRY RAY.